United States Patent
Zhang et al.

(10) Patent No.: US 11,422,382 B2
(45) Date of Patent: Aug. 23, 2022

(54) ALIGEMENT MODULE WITH PREFERRED ILLUMINATION UNIFORMITY APPLIED FOR A PROJECTOR

(71) Applicant: QISDA CORPORATION, Taoyuan (TW)

(72) Inventors: Jia-Ming Zhang, Taichung (TW); Ching-Tze Huang, Taoyuan (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/114,434

(22) Filed: Dec. 7, 2020

(65) Prior Publication Data

US 2022/0066226 A1 Mar. 3, 2022

(30) Foreign Application Priority Data

Sep. 2, 2020 (CN) .......................... 202010910530.5

(51) Int. Cl.
*G02B 27/14* (2006.01)
*G02B 27/28* (2006.01)

(52) U.S. Cl.
CPC ......... *G02B 27/141* (2013.01); *G02B 27/145* (2013.01); *G02B 27/286* (2013.01)

(58) Field of Classification Search
CPC ... G02B 27/141; G02B 27/145; G02B 27/286
See application file for complete search history.

(56) References Cited

U.S. PATENT DOCUMENTS

| 4,995,718 A * | 2/1991 | Jachimowicz | H04N 13/324 348/E13.058 |
|---|---|---|---|
| 5,903,388 A * | 5/1999 | Sedlmayr | H04N 9/317 348/E13.058 |
| 2002/0176054 A1* | 11/2002 | Mihalakis | H04N 9/3167 348/E5.143 |
| 2006/0164607 A1* | 7/2006 | Morejon | G02B 27/1006 348/E9.027 |
| 2006/0244871 A1* | 11/2006 | Tzong | G03B 21/2066 349/9 |

(Continued)

FOREIGN PATENT DOCUMENTS

| KR | 2008-0004990 A * | 1/2008 | ............ G02B 26/10 |
|---|---|---|---|
| WO | WO-2013016163 A2 * | 1/2013 | ......... G02B 27/1033 |

*Primary Examiner* — Magda Cruz

(57) ABSTRACT

An alignment module includes a polarized dichroic mirror, a dichroic mirror, a phase retarding component and several light sources. The polarized dichroic mirror reflects specific beams and is passed by other beams. The dichroic mirror is disposed on a side of the polarized dichroic mirror, and reflects specific beams and is passed by other beams. The phase retarding component is disposed by the dichroic mirror and adapted to transform a polarization state of a beam passing the phase retarding component. The light sources are respectively disposed on different sides of the polarized dichroic mirror, and respectively output a beam toward the polarized dichroic mirror. The polarized dichroic mirror can transmit some beams toward a light pipe, and further transmit other beams toward the dichroic mirror and the phase retarding component for transforming the polarization state and then transmit the transformed beams toward the light pipe.

20 Claims, 5 Drawing Sheets

(56) References Cited

U.S. PATENT DOCUMENTS

2011/0235175 A1* 9/2011 Poon .................... G02B 27/283
                                                    359/487.04
2015/0168817 A1* 6/2015 Cobb ................... H04N 9/3141
                                                        353/31

* cited by examiner

ALIGEMENT MODULE WITH PREFERRED ILLUMINATION UNIFORMITY APPLIED FOR A PROJECTOR

BACKGROUND OF THE INVENTION

1. Field of the Invention

The present invention relates to an alignment module, and more particularly, to an alignment module with preferred illumination uniformity applied for a projector.

2. Description of the Prior Art

The laser projector utilizes the blue laser light source to provide an illuminated beam. The illuminated beam is transformed into an activated beam with other color via a wavelength transforming device (such as a color wheel coated by phosphor or quantum dots), and the activated beam is mixed with the illuminated beam. A conventional alignment module utilizes a dichroic mirror to reflect the illuminated beam, and the illuminated beam passes through a part of a collimator lens toward the color wheel. The activated beam is generated by wavelength transforming material on the color wheel, and the activated beam passes through the collimator lens toward an optical equalizer. In addition, a part of the illuminated beam passes through a part of the color wheel without the wavelength transforming material, and then passes through the other part of the collimator lens toward the optical equalizer, and is mixed with the activated beam. Therefore, the illuminated beam and the activated beam of the conventional alignment module are difficult to uniformly mix, and a projected image generated by the conventional laser projector cannot have expected color uniformity.

SUMMARY OF THE INVENTION

The present invention provides an alignment module with preferred illumination uniformity applied for a projector for solving above drawbacks.

According to the claimed invention, an alignment module includes a polarized dichroic mirror, a dichroic mirror, a phase retarding component, a first light source, a second light source and a third light source. The polarized dichroic mirror is adapted to reflect a first beam and a second beam with a first polarization state, and allow passing of the second beam with a second polarization state and a third beam. The dichroic mirror is disposed on a side of the polarized dichroic mirror, and adapted to reflect the second beam and allow passing of the third beam. The phase retarding component is disposed between the polarized dichroic mirror and the dichroic mirror, and a polarization state of the second beam is transformed by passing the phase retarding component. The first light source is disposed on the other side of the polarized dichroic mirror, and adapted to output the first beam toward the polarized dichroic mirror. The second light source is disposed on the side of the polarized dichroic mirror opposite to the first light source, and adapted to output the second beam so that the second beam with the first polarization state arrives the polarized dichroic mirror. The third light source is disposed on a side of the dichroic mirror opposite to the phase retarding component, and adapted to output the third beam toward the polarized dichroic mirror by means of the dichroic mirror and the phase retarding component.

According to the claimed invention, an alignment module includes a first polarized dichroic mirror, a dichroic mirror, a first phase retarding component, a second polarized dichroic mirror, at least one first light source, at least one second light source and at least one third light source. The first polarized dichroic mirror is adapted to reflect a first beam with a first polarization state, and allow passing of the first beam with a second polarization state, a second beam and a third beam. The dichroic mirror is disposed on a side of the first polarized dichroic mirror, and adapted to reflect the first beam, and allow passing of the second beam and the third beam. The first phase retarding component is disposed between the first polarized dichroic mirror and the dichroic mirror, and a polarization state of the first beam is transformed by passing the first phase retarding component. The second polarized dichroic mirror is disposed on a side of the dichroic mirror opposite to the first phase retarding component, and adapted to reflect the second beam with a first polarization state and the third beam with a first polarization state, and allow passing of the second beam with a second polarization state and the third beam with a second polarization state. The first light source is disposed on at least one side of the first polarized dichroic mirror, and adapted to output the first beam, so that the first beam with the first polarization state arrives the first polarized dichroic mirror. The second light source is disposed on at least one side of the second polarized dichroic mirror, and adapted to output the second beam toward the dichroic mirror by means of the second polarized dichroic mirror. The third light source is disposed adjacent to the second light source, and adapted to output the third beam toward the dichroic mirror by means of the second polarized dichroic mirror.

According to the claimed invention, an alignment module includes a first polarized dichroic mirror, a first polarized dichroic mirror, a first phase retarding component, a second polarized dichroic mirror, a second dichroic mirror, a second phase retarding component, at least one first light source, at least one second light source and a third light source. The first polarized dichroic mirror is adapted to reflect a first beam with a first polarization state, and allow passing of the first beam with a second polarization state, a second beam and a third beam. The first dichroic mirror is disposed on a side of the first polarized dichroic mirror, and adapted to reflect the first beam, and allow passing of the second beam and the third beam. The first phase retarding component is disposed between the first polarized dichroic mirror and the first dichroic mirror, and a polarization state of the first beam is transformed by passing the first phase retarding component. The second polarized dichroic mirror is disposed on a side of the first dichroic mirror opposite to the first phase retarding component, and adapted to reflect the second beam with a first polarization state, and allow passing of the third beam and the second beam with a second polarization state. The second dichroic mirror is disposed on a side of the second polarized dichroic mirror opposite to the first polarized dichroic mirror, and adapted to reflect the second beam and allow passing of the third beam. The second phase retarding component is disposed between the second polarized dichroic mirror and the second dichroic mirror, and a polarization state of the second beam is transformed by passing the second phase retarding component. The first light source is disposed on at least one side of the first polarized dichroic mirror, and adapted to output the first beam so that the first beam with the first polarization state arrives the first polarized dichroic mirror. The second light source is disposed on at least one side of the second polarized dichroic mirror, and adapted to output the second beam, so that the second beam with the first polarization state arrives the second polarized dichroic mirror. The third light source is disposed on a side of the second dichroic mirror opposite to the second polarized dichroic mirror, and adapted to output the third beam toward the second polarized dichroic mirror by means of the second dichroic mirror and the second phase retarding component.

According to the claimed invention, an alignment module includes a polarized dichroic mirror, a dichroic mirror, a phase retarding component, a first light source, a second light source and a third light source. The polarized dichroic mirror is adapted to allow passing of a first beam and a second beam with a second polarization state, and reflect the second beam with a first polarization state and a third beam. The dichroic mirror is disposed on a side of the polarized dichroic mirror, and adapted to allow passing of the first beam and the third beam, and reflect the second beam. The phase retarding component is disposed between the polarized dichroic mirror and the dichroic mirror, and a polarization state of the second beam is transformed by passing the phase retarding component. The first light source is disposed on the other side of the polarized dichroic mirror, and adapted to output the first beam toward the polarized dichroic mirror. The second light source is disposed on the other side of the polarized dichroic mirror opposite to the dichroic mirror and the phase retarding component, and adapted to output the second beam, so that the second beam with the second polarization state arrives the polarized dichroic mirror. The third light source is disposed on a side of the dichroic mirror opposite to the phase retarding component, and adapted to output the third beam toward the polarized dichroic mirror by means of the dichroic mirror and the phase retarding component.

The RGB laser light sources can have pure color index and wider color gamut, and the RGB laser light sources preferably can be arranged in symmetry to provide preferred color uniformity. The present invention can develop several types of the alignment module by assembling the laser light sources with the polarized dichroic mirror, the non-polarized dichroic mirror and the phase retarding component with different position, different amounts and different properties, so as to build the alignment module capable of having the tight structural design and adjusting the laser light sources to vary the illumination in accordance with demands of the volume, height and cost of the projector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
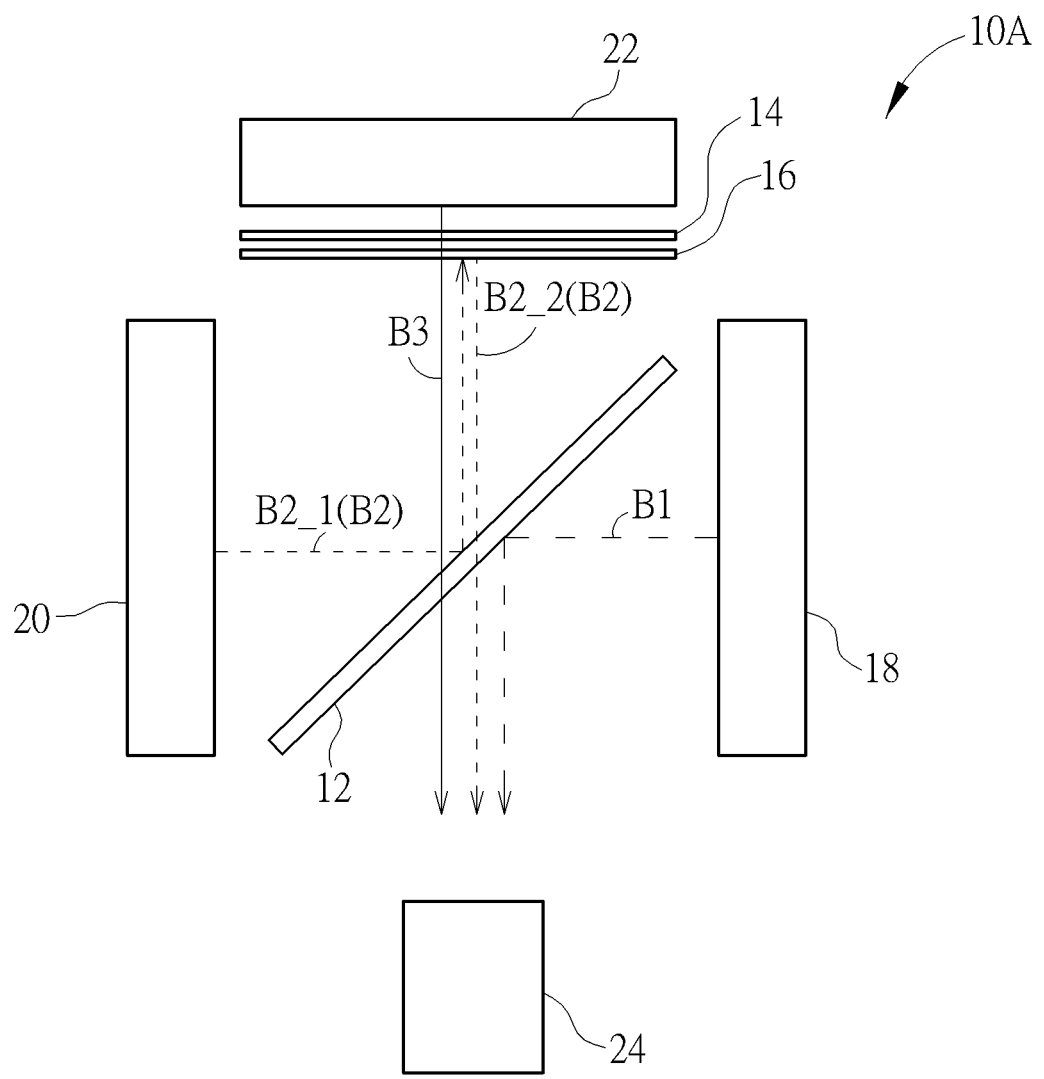
FIG. 1 is a diagram of an alignment module according to a first embodiment of the present invention.

Please refer to FIG. 1. FIG. 1 is a diagram of an alignment module 10A according to a first embodiment of the present invention. The alignment module 10A has advantages of tight structural design and well mixed illumination. The alignment module 10A can be applied for a projector so that the projector can conform to trends of miniature form and high brightness. The alignment module 10A can include a polarized dichroic mirror 12, a dichroic mirror 14, a phase retarding component 16, a first light source 18, a second light source 20, a third light source 22 and an optical equalizer 24. The first light source 18, the second light source 20 and the third light source 22 preferably can be laser light sources, which depend on an actual demand. For example, if the alignment module 10A includes specific lens assembly, the first light source 18, the second light source 20 and the third light source 22 can be white light sources.

The first light source 18, the second light source 20 and the third light source 22 can respectively output a first beam B1, a second beam B2 and a third beam B3. For example, the first beam B1 can be red light, the second beam B2 can be blue light, and the third beam B3 can be green light. The polarized dichroic mirror 12 has a specific polarized dichroic design, and can reflect the first beam B1 and the second beam B2_1 with a first polarization state, and allow passing of the second beam B2_2 with a second polarization state and the third beam B3. The dichroic mirror 14 can be disposed on a side of the polarized dichroic mirror 12, and adapted to reflect the second beam B2, and allow passing of the third beam B3. The phase retarding component 16 can be disposed between the polarized dichroic mirror 12 and the dichroic mirror 14. A polarization state of the second beam B2 can be transformed when passing through the phase retarding component 16.

The first light source 18 can be disposed on the other side of the polarized dichroic mirror 12 different form the dichroic mirror 14. The second light source 20 can be disposed on the side of the polarized dichroic mirror 12 identical with the dichroic mirror 14. The second light source 20 can be opposite to the first light source 18. The third light source 22 can be disposed on a side of the dichroic mirror 14 opposite to the phase retarding component 16. The first light source 18 can output the first beam B1 directly toward the polarized dichroic mirror 12. The second light source 20 can output the second beam B2_1 with the first polarization state toward the polarized dichroic mirror 12; further, the second light source 20 may output the non-polarized second beam B2, and the non-polarized second beam B2 can be transformed into the polarized second beam B2 via some specific optical component (such as a polarizer and not shown in the figure) to arrive the polarized dichroic mirror 12. The third light source 22 can output the third beam B3 toward the polarized dichroic mirror 12 by means of the dichroic mirror 14 and the phase retarding component 16.

The optical equalizer 24 can be a light pipe, or any component with similar functions. The optical equalizer 24 can be disposed on the other side of the polarized dichroic mirror 12 opposite to the third light source 22, and adapted to receive and equalize the first beam B1, the second beam B2 and the third beam B3. The phase retarding component 16 can transform the polarization state of the second beam B2. In the first embodiment, the phase retarding component 16 can be a quarter wave plate, and depends on the actual demand. It should be mentioned that the present invention preferably can set an angle between a planar normal vector of the polarized dichroic mirror 12 and a planar normal vector of the dichroic mirror 14 as forty-five degrees, or the foresaid angle can have ten percentage of tolerance based on the forty-five degrees; in addition, the present invention preferably can set an angle between the planar normal vector of the polarized dichroic mirror 12 and a planar normal vector of the phase retarding component 16 as the forty-five degrees, or the foresaid angle can have the ten percentage of tolerance based on the forty-five degrees.

When the first beam B1 output by the first light source 18 arrives the polarized dichroic mirror 12, the first beam B1 can be reflected by the polarized dichroic mirror 12 and enter the optical equalizer 24. When the second beam B2_1 with the first polarization state from the second light source 20 arrives the polarized dichroic mirror 12, the second beam B2_1 with the first polarization state can be reflected by the polarized dichroic mirror 12 to pass through the phase retarding component 16 and arrive the dichroic mirror 14, and then be reflected by the dichroic mirror 14 to pass through the phase retarding component 16 for transforming into the second beam B2_2 with the second polarization state. The second beam B2_2 with the second polarization state can directly pass through the polarized dichroic mirror 12 and enter the optical equalizer 24. The third beam B3 output by the third light source 22 can pass through the dichroic mirror 14 and the phase retarding component 16 without transformation of the polarization state, and then pass through the polarized dichroic mirror 12 to enter the optical equalizer 24.

Design of relative angles between the polarized dichroic mirror 12, the dichroic mirror 14 and the phase retarding component 16 can ensure that the first beam B1, the second beam B2 and the third beam B3 can be well mixed to enter the optical equalizer 24. Thus, the first embodiment of the present invention can utilize a small quantity of optical components, such as the polarized dichroic mirror 12, the dichroic mirror 14 and the phase retarding component 16, to uniformly mix the output beams from the first light source 18, the second light source 20 and the third light source 22 for entering the optical equalizer 24, so as to acquire the alignment module 10A with the tight structural design.

Figure 2:
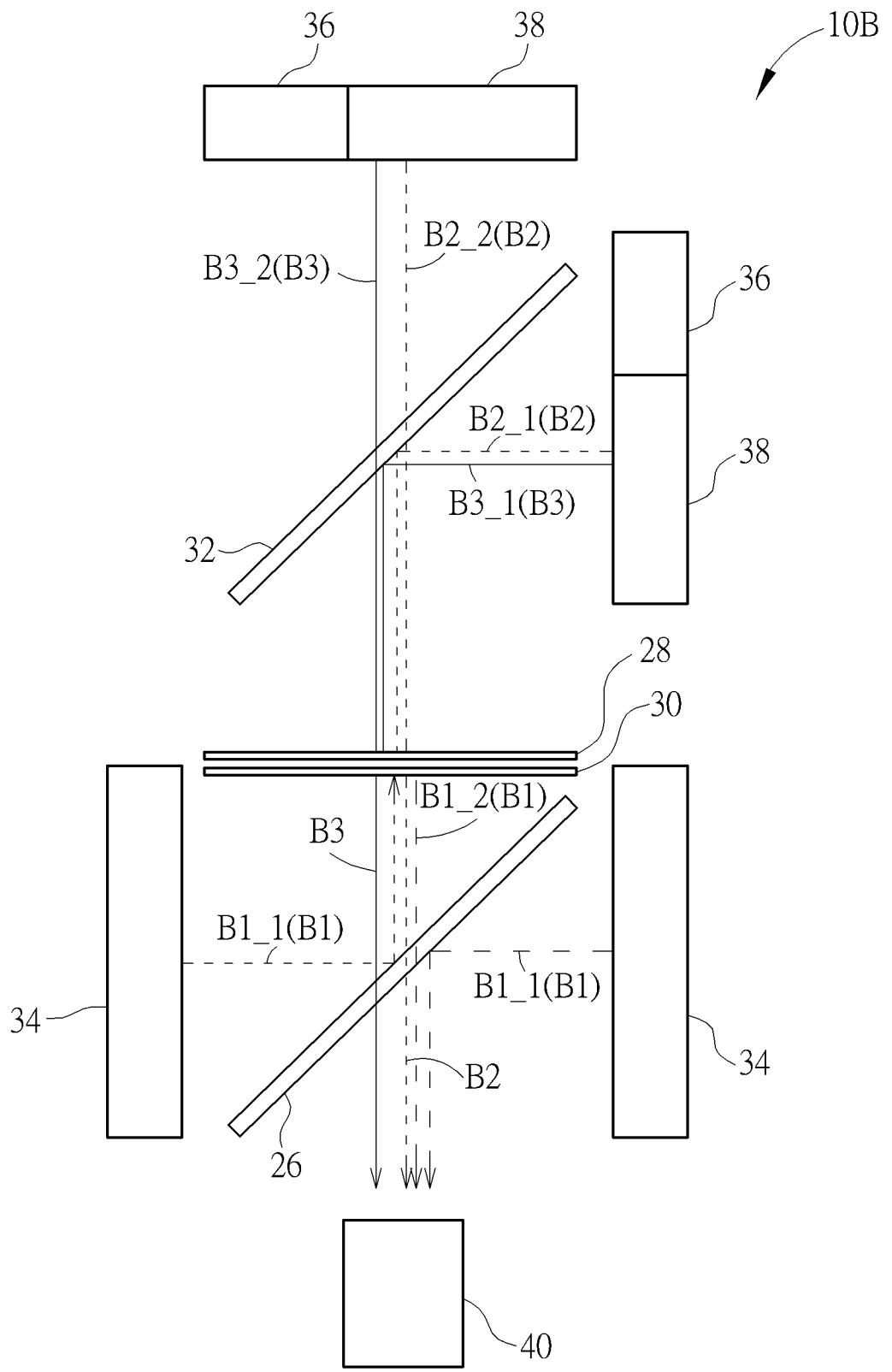
FIG. 2 is a diagram of an alignment module according to a second embodiment of the present invention.

Please refer to FIG. 2. FIG. 2 is a diagram of an alignment module 10B according to a second embodiment of the present invention. The alignment module 10B can include a first polarized dichroic mirror 26, a dichroic mirror 28, a first phase retarding component 30, a second polarized dichroic mirror 32, a first light source 34, a second light source 36, a third light source 38 and an optical equalizer 40. As the first embodiment mentioned above, the first light source 34, the second light source 36 and the third light source 38 preferably can be the laser light source. Moreover, amounts of the first light source 34, the second light source 36 and the third light source 38 may be two, which depends on the actual demand; for example, the alignment module 10B can include one first light source 34, one second light source 36 and one third light source 38.

The first light source 34, the second light source 36 and the third light source 38 can respectively output the first beam B1, the second beam B2 and the third beam B3. Color of the three beams can be similar to the first embodiment, and a detailed description is omitted herein for simplicity. In the second embodiment, the first polarized dichroic mirror 26 can reflect the first beam B1_1 with the first polarization state, and allow passing of the first beam B1_2 with the second polarization state, the second beam B2 and the third beam B3. The dichroic mirror 28 can be disposed on a side of the first polarized dichroic mirror 26, and adapted to reflect the first beam B1, and allow passing of the second beam B2 and the third beam B3. The first phase retarding component 30 can be disposed between the first polarized dichroic mirror 26 and the dichroic mirror 28. The polarization state of the first beam B1 can be transformed by passing the first phase retarding component 30. The second polarized dichroic mirror 32 can be disposed on a side of the dichroic mirror 28 opposite to the first phase retarding component 30, and adapted to reflect the second beam B2_1 with the first polarization state and the third beam B3_1 with the first polarization state, and allow passing of the second beam B2_2 with the second polarization state and the third beam B3_2 with the second polarization state.

The second embodiment includes two first light sources 34, two second light sources 36 and two third light sources 38. The two first light sources 34 can be respectively disposed on two opposite sides of the first polarized dichroic mirror 26. The two second light sources 36 can be respectively disposed on two opposite sides of the second polarized dichroic mirror 32. The two third light sources 38 can be respectively disposed adjacent to the two second light sources 36. The optical equalizer 40 can be disposed on a side of the first polarized dichroic mirror 26 opposite to the second polarized dichroic mirror 32, and adapted to receive and equalize the first beam B1, the second beam B2 and the third beam B3. The first phase retarding component 30 can transform the polarization state of the beams and be designed as the quarter wave plate, which depends on the actual demand.

In the second embodiment, one first light source 34 can be disposed on the side of the first polarized dichroic mirror 26 different from the dichroic mirror 28, and the other first light source 34 can be disposed on the other side of the first polarized dichroic mirror 26 identical with the dichroic mirror 28. Besides, the dichroic mirror 28 and the optical equalizer 40 can be respectively located on two opposite sides of the first polarized dichroic mirror 26, the two first light sources 34 can be respectively located on two opposite sides of the first polarized dichroic mirror 26, but position of the two first light sources 34 are different from position of the dichroic mirror 28 and the optical equalizer 40. Further, one second light source 36 can be disposed on the side of the second polarized dichroic mirror 32 different from the dichroic mirror 28, and further can be opposite to the dichroic mirror 28 via the second polarized dichroic mirror 32; the other second light source 36 can be disposed on the other side of the second polarized dichroic mirror 32 similar to the dichroic mirror 28, and position of the second light source 36 can be different from position of the dichroic mirror 28.

The two first light sources 34 can respectively output the first beams B1, so that the first beams B1_1 with the first polarization state can arrive the first polarized dichroic mirror 26. The first beam B1_1 with the first polarization state from the right-side first light source 34 can be reflected by the first polarized dichroic mirror 26 to enter the optical equalizer 40. The first beam B1_1 with the first polarization state from the left-side first light source 34 can be reflected by the first polarized dichroic mirror 26 to pass through the first phase retarding component 30 and arrive the dichroic mirror 28, and further be reflected by the dichroic mirror 28 to pass through the first phase retarding component 30 for transforming into first beam B1_2 with the second polarization state, so as to pass through the first polarized dichroic mirror 26 and enter the optical equalizer 40. Generally, the first light source 34 can directly output the first beam B1_1 with the first polarization state toward the first polarized dichroic mirror 26; further, the first light source 34 can output the non-polarized first beam B1, and the non-polarized first beam B1 can be transformed into the polarized first beam B1 via the specific optical component (such as the polarizer and not shown in the figure) to arrive the first polarized dichroic mirror 26.

In addition, the two second light sources 36 can respectively output the second beam B2_1 with the first polarization state and the second beam B2_2 with the second polarization state toward the second polarized dichroic mirror 32. The two third light sources 38 can respectively output the third beam B3_1 with the first polarization state and the third beam B3_2 with the second polarization state toward the second polarized dichroic mirror 32. The second polarized dichroic mirror 32 can reflect the second beam B2_1 with the first polarization state and the third beam B3_1 with the first polarization state, so that the second beam B2_1 and the third beam B3_1 can pass through the dichroic mirror 28, the first phase retarding component 30 and the first polarized dichroic mirror 26 to enter the optical equalizer 40. The second polarized dichroic mirror 32 further can allow passing of the second beam B2_2 with the second polarization state and the third beam B3_2 with the second polarization state, so that the second beam B2_2 and the third beam B3_2 can pass through the dichroic mirror 28, the first phase retarding component 30 and the first polarized dichroic mirror 26 to enter the optical equalizer 40.

Figure 3:
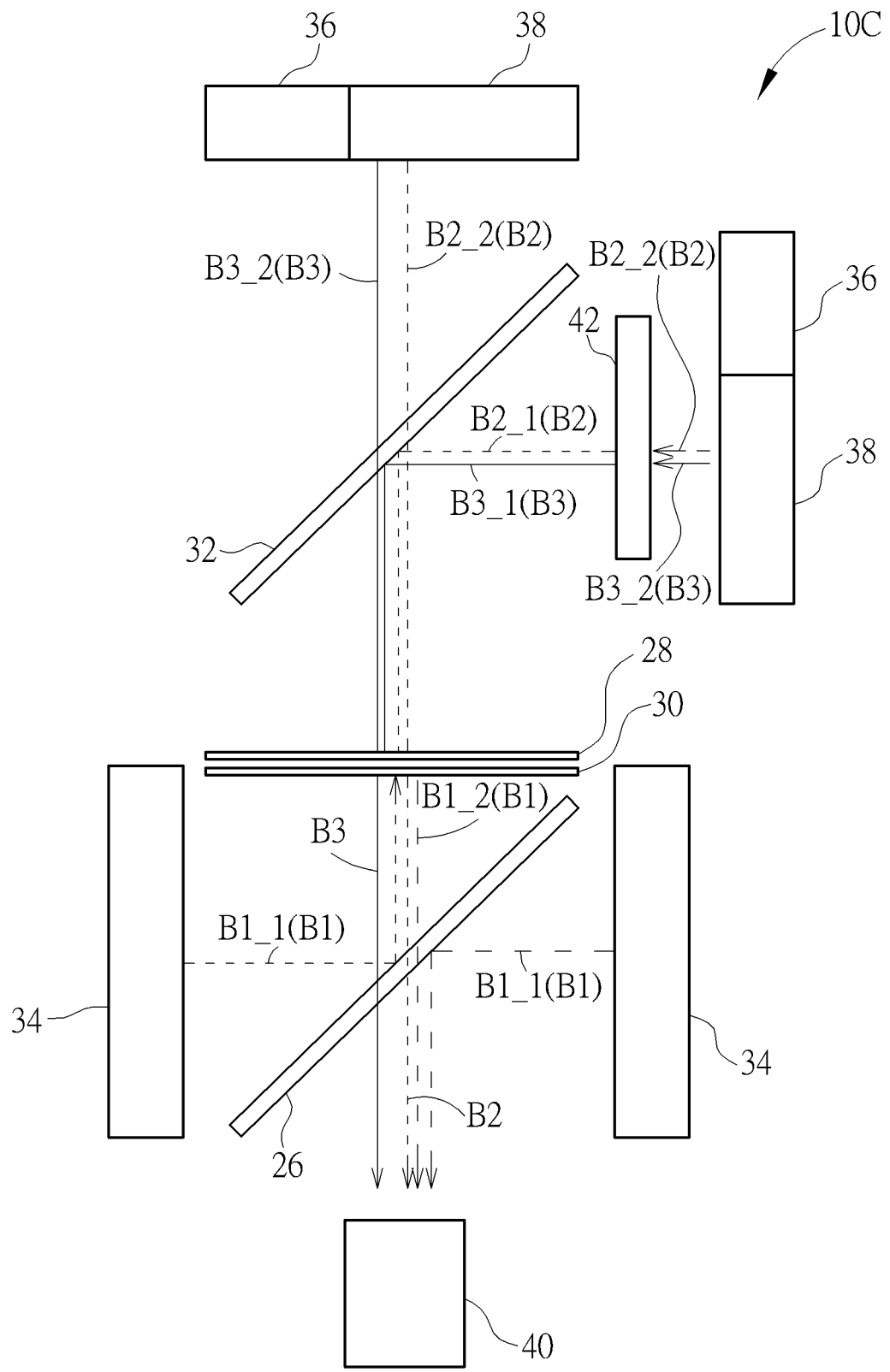
FIG. 3 is a diagram of an alignment module according to a third embodiment of the present invention.

Please refer to FIG. 3. FIG. 3 is a diagram of an alignment module 10C according to a third embodiment of the present invention. The alignment module 10C can include the first polarized dichroic mirror 26, the dichroic mirror 28, the first phase retarding component 30, the second polarized dichroic mirror 32, the first light source 34, the second light source 36, the third light source 38, the optical equalizer 40 and a second phase retarding component 42. In the third embodiment, elements having the same numerals as ones of the second embodiment have the same structures and functions, and a detailed description is omitted herein for simplicity. Comparing to the alignment module 10B in the second embodiment, the alignment module 10C can dispose the second phase retarding component 42 between the second polarized dichroic mirror 32 and one assembly of the second light source 36 and the third light source 38, such as position between the second polarized dichroic mirror 32 and the right-side assembly of the second light source 36 and the third light source 38.

In the third embodiment, the right-side assembly of the second light source 36 and the third light source 38 can respectively output the second beam B2_2 with the second polarization state and the third beam B3_2 with the second polarization state. The second beam B2_2 and the third beam B3_2 can pass through the second phase retarding component 42 and be transformed into the second beam B2_1 with the first polarization state and the third beam B3_1 with the first polarization state. The second beam B2_1 and the third beam B3_1 can be reflected by the second polarized dichroic mirror 32, and be mixed with the second beam B2_2 and the third beam B3_2 (which pass through the second polarized dichroic mirror 32) to enter the optical equalizer 40. The second phase retarding component 42 can transform the polarization state of the beams, and can be designed as one half wave plate or two quarter wave plates, which depends on the design demand.

Figure 4:
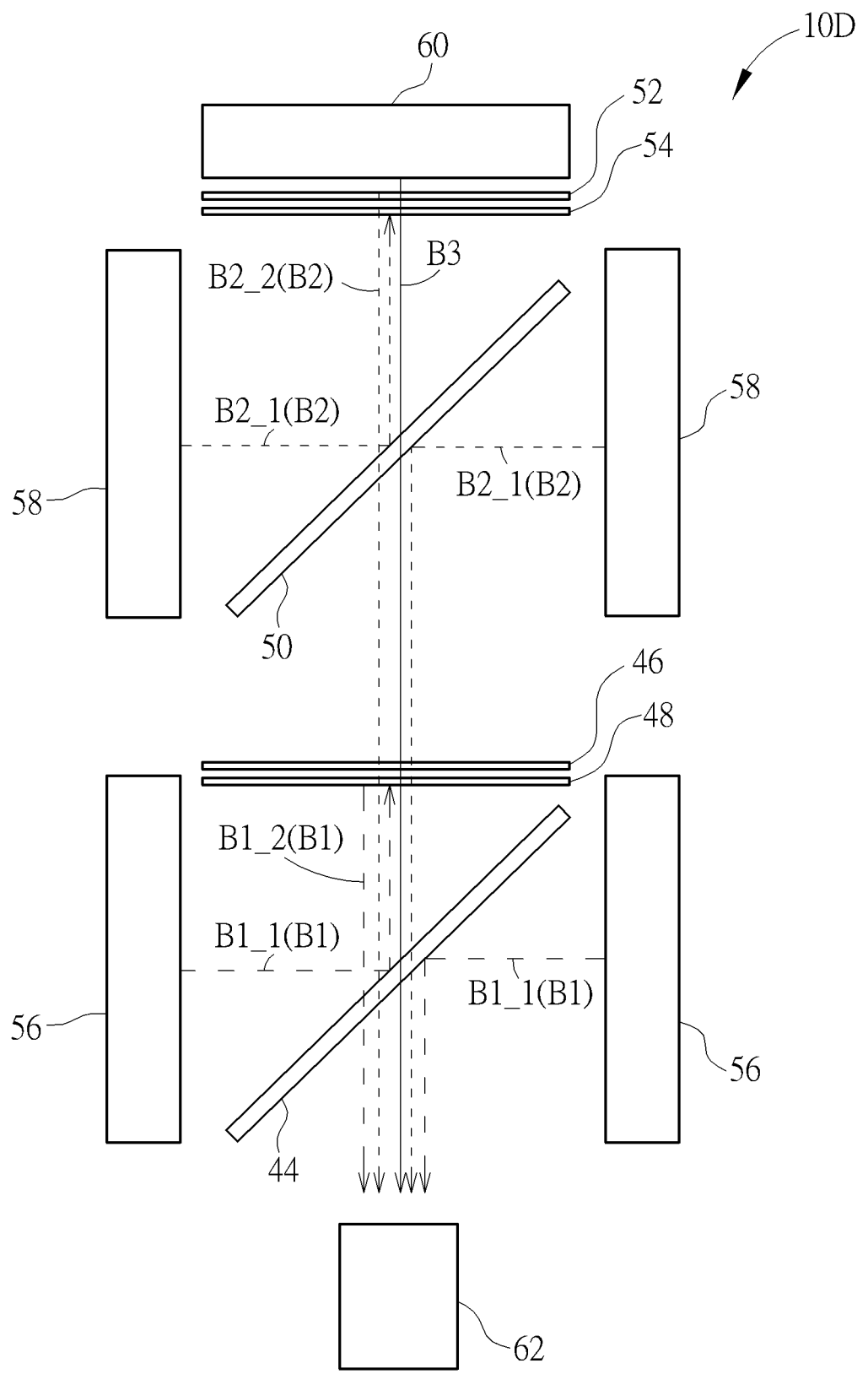
FIG. 4 is a diagram of an alignment module according to a fourth embodiment of the present invention.

Please refer to FIG. 4. FIG. 4 is a diagram of an alignment module 10D according to a fourth embodiment of the present invention. The alignment module 10D can include a first polarized dichroic mirror 44, a first dichroic mirror 46, a first phase retarding component 48, a second polarized dichroic mirror 50, a second dichroic mirror 52, a second phase retarding component 54, a first light source 56, a second light source 58, a third light source 60 and an optical equalizer 62. As the embodiments mentioned above, the first light source 56, the second light source 58 and the third light source 60 preferably can be the laser light source. In addition, amounts of the first light source 56 and the second light source 58 can be two, which depends on the actual demand; for example, the fourth embodiment may include one first light source 56 and one second light source 58.

The first light source 56, the second light source 58 and the third light source 60 can respectively output the first beam B1, the second beam B2 and the third beam B3. Color of the three beams can be similar to the foresaid embodiments, and a detailed description is omitted herein for simplicity. In the fourth embodiment, the first polarized dichroic mirror 44 can reflect the first beam B1_1 with the first polarization state, and allow passing of the first beam B1_2 with the second polarization state, the second beam B2 and the third beam B3. The first dichroic mirror 46 can be disposed on the side of the first polarized dichroic mirror 44, and adapted to reflect the first beam B1, and allow passing of the second beam B2 and the third beam B3. The first phase retarding component 48 can be disposed between the first polarized dichroic mirror 44 and the first dichroic mirror 46. The polarization state of the first beam B1 can be transformed by passing the first phase retarding component 48.

In addition, the second polarized dichroic mirror 50 can be disposed on the side of the first dichroic mirror 46 opposite to the first phase retarding component 48, and adapted to reflect the second beam B2_1 with the first polarization state, and allow passing of the second beam B2_2 with the second polarization state and the third beam B3. The second dichroic mirror 52 can be disposed on the side of the second polarized dichroic mirror 50 opposite to the first polarized dichroic mirror 44, and adapted to reflect the second beam B2, and allow passing of the third beam B3. The second phase retarding component 54 can be disposed between the second polarized dichroic mirror 50 and the second dichroic mirror 52. The polarization state of the second beam B2 can be transformed by passing the second phase retarding component 54. The optical equalizer 62 can be disposed on the side of the first polarized dichroic mirror 44 opposite to the second polarized dichroic mirror 50, and adapted to receive and equalize the first beam B1, the second beam B2 and the third beam B3.

The fourth embodiment preferably can have two first light sources 56, two second light sources 58 and one third light source 60. The two first light sources 56 can be respectively disposed on two opposite sides of the first polarized dichroic mirror 44; the first dichroic mirror 46 and the optical equalizer 62 are respectively disposed on the opposite sides of the first polarized dichroic mirror 44, but position of the two first light sources 56 are different from position of the first dichroic mirror 46 and the optical equalizer 62. The two second light sources 58 can be respectively disposed on two opposite sides of the second polarized dichroic mirror 50; the first dichroic mirror 46 and the second dichroic mirror 52 are respectively disposed on the opposite sides of the second polarized dichroic mirror 50, but position of the two second light sources 58 are different from position of the first dichroic mirror 46 and the second dichroic mirror 52. The third light source 60 can be disposed on the side of the second dichroic mirror 52 opposite to the second polarized dichroic mirror 50.

The two first light sources 56 can respectively output the first beams B1, so that the first beams B1_1 with the first polarization state can arrive the first polarized dichroic mirror 44. The first beam B1_1 with the first polarization state from the right-side first light source 56 can be reflected by the first polarized dichroic mirror 44 to enter the optical equalizer 62. The first beam B1_1 with the first polarization state from the left-side first light source 56 can be reflected by the first polarized dichroic mirror 44 to pass through the first phase retarding component 48 and arrive the first dichroic mirror 46, and then be reflected by the first dichroic mirror 46 to pass through the first phase retarding component 48, for transforming into the first beam B1_2 with the second polarization state; the first beam B1_2 with the second polarization state can pass through the first polarized dichroic mirror 44 and enter the optical equalizer 62. Generally, the first light source 56 can directly output the first beam B1_1 with the first polarization state toward the first polarized dichroic mirror 44; further, the first light source 56 may output the non-polarized first beam B1, and the non-polarized first beam B1 can be transformed into the polarized first beam B1 via the specific optical component (such as the polarizer and not shown in the figure) to arrive the first polarized dichroic mirror 44.

The two second light sources 58 can respectively output the second beams B2, so that the second beam B2_1 with the first polarization state can arrive the second polarized dichroic mirror 50. The second beam B2_1 with the first polarization state from the right-side second light source 58 can be reflected by the second polarized dichroic mirror 50 to pass through the first dichroic mirror 46, the first phase retarding component 48 and the first polarized dichroic mirror 44 for entering the optical equalizer 62. The second beam B2_1 with the first polarization state from the left-side second light source 58 can be reflected by the second polarized dichroic mirror 50 to pass through the second phase retarding component 54 and arrive the second dichroic mirror 52; the second beam B2_1 with the first polarization state can be reflected by the second dichroic mirror 52 to pass through the second phase retarding component 54, and then transformed into the second beam B2_2 with the second polarization state to pass through the second polarized dichroic mirror 50, the first dichroic mirror 46, the first phase retarding component 48 and the first polarized dichroic mirror 44 for entering the optical equalizer 62. Generally, the second light source 58 can directly output the second beam B2_1 with the first polarization state toward the second polarized dichroic mirror 50; further, the second light source 58 may output the non-polarized second beam B2, and the non-polarized second beam B2 can be transformed into the polarized second beam B2 via the specific optical component (such as the polarizer and not shown in the figure) to arrive the second polarized dichroic mirror 50.

In addition, the third beam B3 output by the third light source 60 can pass through the second dichroic mirror 52 and the second phase retarding component 54 in sequence without transformation of the polarization state, and then pass through the second polarized dichroic mirror 50, the first dichroic mirror 46, the first phase retarding component 48 and the first polarized dichroic mirror 44 to enter the optical equalizer 62, for mixing with the first beam B1 and the second beam B2. Therefore, the first phase retarding component 48 and the second phase retarding component 54 can be designed as the quarter wave plate for transforming the polarization state of the beams, which depend on the actual demand.

Figure 5:
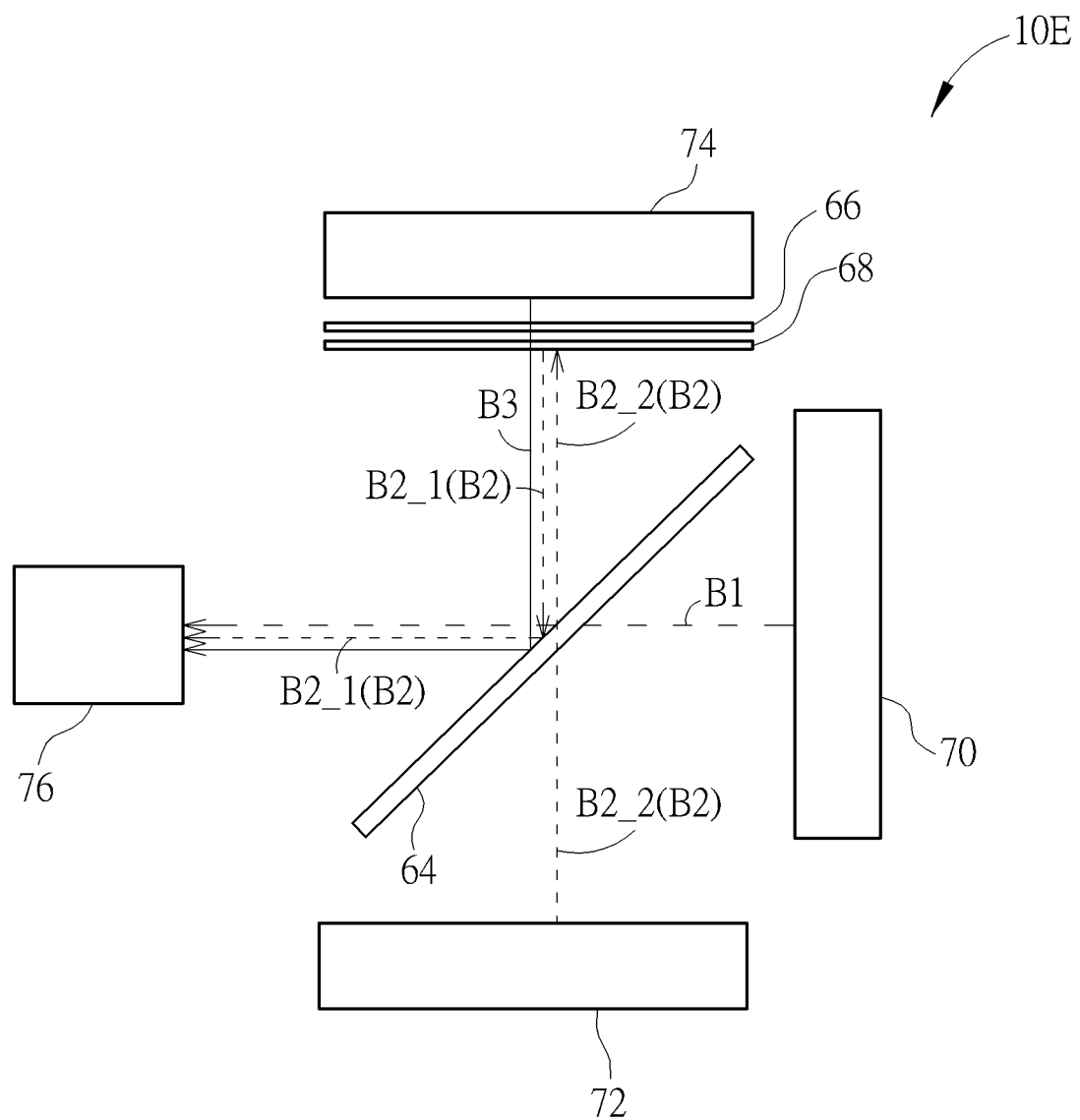
FIG. 5 is a diagram of an alignment module according to a fifth embodiment of the present invention.

Please refer to FIG. 5. FIG. 5 is a diagram of an alignment module 10E according to a fifth embodiment of the present invention. The alignment module 10E can include a polarized dichroic mirror 64, a dichroic mirror 66, a phase retarding component 68, a first light source 70, a second light source 72, a third light source 74 and an optical equalizer 76. As the embodiments mentioned above, the first light source 70, the second light source 72 and the third light source 74 preferably can be the laser light source, which depends on the actual demand. The first light source 70, the second light source 72 and the third light source 74 can respectively output the first beam B1, the second beam B2 and the third beam B3; Color of the three beams can be similar to the first embodiment, and a detailed description is omitted herein for simplicity.

In the fifth embodiment, the polarized dichroic mirror 64 can allow passing of the first beam B1 and the second beam B2_2 with the second polarization state, and reflect the second beam B2_1 with the first polarization state and the third beam B3. The dichroic mirror 66 can be disposed on the side of the polarized dichroic mirror 64, and adapted to allow passing of the third beam B3, and reflect the second beam B2. The phase retarding component 68 can be disposed between the polarized dichroic mirror 64 and the dichroic mirror 66. The polarization state of the second beam B2 can be transformed by passing the phase retarding component 68, and therefore the phase retarding component 68 can be designed as the quarter wave plate, which depends on the actual demand. The first light source 70 can be disposed on the other side of the polarized dichroic mirror 64. The second light source 72 can be disposed on the other side of the polarized dichroic mirror 64 but further opposite to the dichroic mirror 66 and the phase retarding component 68. The third light source 74 can be disposed on the side of the dichroic mirror 66 opposite to the phase retarding component 68. The optical equalizer 76 can be disposed on the other side of the polarized dichroic mirror 64 opposite to the first light source 70, and adapted to receive and equalize the first beam B1, the second beam B2 and the third beam B3.

Thus, the first beam B1 output by the first light source 70 can pass through the polarized dichroic mirror 64 to arrive the optical equalizer 76. The second light source 72 can output the second beam B2, so that the second beam B2_2 with the second polarization state can arrive the polarized dichroic mirror 64. The second beam B2_2 with the second polarization state can pass through the polarized dichroic mirror 64, and then pass through the phase retarding component 68 to arrive the dichroic mirror 66, and be reflected by the dichroic mirror 66 to further pass through the phase retarding component 68 for transforming into the second beam B2_1 with the first polarization state. The second beam B2_1 with the first polarization state can be reflected by the polarized dichroic mirror 64 and enter the optical equalizer 76. The second light source 72 can directly output the second beam B2_2 with the second polarization state toward the polarized dichroic mirror 64; further, the second light source 72 may output the non-polarized second beam B2, and the non-polarized second beam B2 can be transformed into the polarized second beam B2 via the specific optical component (such as the polarizer and not shown in the figure) to arrive the polarized dichroic mirror 64. The third beam B3 output by the third light source 74 can pass through the dichroic mirror 66 and the phase retarding component 68 without transformation of the polarization state to arrive the polarized dichroic mirror 64, and then be reflected by the polarized dichroic mirror 64 to enter the optical equalizer 76.

In conclusion, the RGB laser light sources can have pure color index and wider color gamut, and the RGB laser light sources preferably can be arranged in symmetry to provide preferred color uniformity. The present invention can develop several types of the alignment module by assembling the laser light sources with the polarized dichroic mirror, the non-polarized dichroic mirror and the phase retarding component with different position, different amounts and different properties, so as to build the alignment module capable of having the tight structural design and adjusting the laser light sources to vary the illumination in accordance with demands of the volume, height and cost of the projector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An alignment module, comprising:
a polarized dichroic mirror, adapted to reflect a first beam and a second beam with a first polarization state, and allow passing of the second beam with a second polarization state and a third beam;
a dichroic mirror disposed on a side of the polarized dichroic mirror, and adapted to reflect the second beam and allow passing of the third beam;
a phase retarding component disposed between the polarized dichroic mirror and the dichroic mirror, a polarization state of the second beam being transformed by passing the phase retarding component;
a first light source disposed on the other side of the polarized dichroic mirror, and adapted to output the first beam toward the polarized dichroic mirror;
a second light source disposed on the side of the polarized dichroic mirror opposite to the first light source, and adapted to output the second beam so that the second beam with the first polarization state arrives the polarized dichroic mirror; and
a third light source, the phase retarding component being disposed between the third light source and the polarized dichroic mirror, the third light source being adapted to output the third beam toward the polarized dichroic mirror by passing through the dichroic mirror and the phase retarding component.

2. The alignment module of claim 1, further comprising:
an optical equalizer disposed on the other side of the polarized dichroic mirror opposite to the third light source, and adapted to receive and equalize the first beam, the second beam and the third beam.

3. The alignment module of claim 1, wherein the phase retarding component is a quarter wave plate.

4. The alignment module of claim 1, wherein an angle between a planar normal vector of the polarized dichroic mirror and a planar normal vector of the dichroic mirror is equal to or similar to forty-five degrees, an angle between the planar normal vector of the polarized dichroic mirror and a planar normal vector of the phase retarding component is equal to or similar to forty-five degrees.

5. An alignment module, comprising:
a first polarized dichroic mirror, adapted to reflect a first beam with a first polarization state, and allow passing of the first beam with a second polarization state, a second beam and a third beam;
a dichroic mirror disposed on a side of the first polarized dichroic mirror, and adapted to reflect the first beam, and allow passing of the second beam and the third beam;
a first phase retarding component disposed between the first polarized dichroic mirror and the dichroic mirror, a polarization state of the first beam being transformed by passing the first phase retarding component;
a second polarized dichroic mirror disposed on a side of the dichroic mirror opposite to the first phase retarding component, and adapted to reflect the second beam with a first polarization state and the third beam with a first polarization state, and allow passing of the second beam with a second polarization state and the third beam with a second polarization state;
at least one first light source disposed on at least one side of the first polarized dichroic mirror, and adapted to output the first beam so that the first beam with the first polarization state arrives the first polarized dichroic mirror;
at least one second light source disposed on at least one side of the second polarized dichroic mirror, and adapted to output the second beam toward the dichroic mirror by passing through the second polarized dichroic mirror; and
at least one third light source disposed adjacent to the second light source, and adapted to output the third beam toward the dichroic mirror by passing through the second polarized dichroic mirror.

6. The alignment module of claim 5, further comprising:
an optical equalizer disposed on a side of the first polarized dichroic mirror opposite to the second polarized dichroic mirror, and adapted to receive and equalize the first beam, the second beam and the third beam.

7. The alignment module of claim 5, wherein the first phase retarding component is a quarter wave plate.

8. The alignment module of claim 5, wherein the alignment module comprises two first light sources, one of the first light sources is disposed on the other side of the first polarized dichroic mirror, and the other first light source is disposed on the side of the first polarized dichroic mirror adjacent to the dichroic mirror.

9. The alignment module of claim 5, wherein the second light source outputs the second beam with a second polarization state, the alignment module further comprises a second phase retarding component disposed between the second polarized dichroic mirror and the second light source.

10. The alignment module of claim 9, wherein the second phase retarding component is a half wave plate or two quarter wave plates.

11. The alignment module of claim 5, wherein the alignment module comprises two second light sources, one of the second light sources outputs the second beam with a first polarization state, and the other second light source outputs the second beam with a second polarization state.

12. The alignment module of claim 5, wherein the third light source outputs the third beam with a second polarization state, the alignment module further comprises a second phase retarding component disposed between the second polarized dichroic mirror and the third light source.

13. The alignment module of claim 12, wherein the second phase retarding component is a half wave plate or two quarter wave plates.

14. The alignment module of claim 5, wherein the alignment module comprises two third light sources, one of the third light sources outputs the third beam with a first polarization state, and the other third light source outputs the third beam with a second polarization state.

15. An alignment module, comprising:
a first polarized dichroic mirror, adapted to reflect a first beam with a first polarization state, and allow passing of the first beam with a second polarization state, a second beam and a third beam;
a first dichroic mirror disposed on a side of the first polarized dichroic mirror, and adapted to reflect the first beam, and allow passing of the second beam and the third beam;
a first phase retarding component disposed between the first polarized dichroic mirror and the first dichroic mirror, a polarization state of the first beam being transformed by passing the first phase retarding component;
a second polarized dichroic mirror disposed on a side of the first dichroic mirror opposite to the first phase retarding component, and adapted to reflect the second beam with a first polarization state, and allow passing of the third beam and the second beam with a second polarization state;
a second dichroic mirror disposed on a side of the second polarized dichroic mirror opposite to the first polarized dichroic mirror, and adapted to reflect the second beam and allow passing of the third beam;
a second phase retarding component disposed between the second polarized dichroic mirror and the second dichroic mirror, a polarization state of the second beam being transformed by passing the second phase retarding component;
at least one first light source disposed on at least one side of the first polarized dichroic mirror, and adapted to output the first beam so that the first beam with the first polarization state arrives the first polarized dichroic mirror;
at least one second light source disposed on at least one side of the second polarized dichroic mirror, and adapted to output the second beam so that the second beam with the first polarization state arrives the second polarized dichroic mirror; and
a third light source disposed on a side of the second dichroic mirror opposite to the second polarized dichroic mirror, and adapted to output the third beam toward the second polarized dichroic mirror by passing through the second dichroic mirror and the second phase retarding component.

16. The alignment module of claim 15, further comprising:
an optical equalizer disposed on a side of the first polarized dichroic mirror opposite to the second polarized dichroic mirror, and adapted to receive and equalize the first beam, the second beam and the third beam.

17. The alignment module of claim 15, wherein the first phase retarding component is a quarter wave plate, and the second phase retarding component is the quarter wave plate.

18. An alignment module, comprising:
a polarized dichroic mirror, adapted to allow passing of a first beam and a second beam with a second polarization state, and reflect the second beam with a first polarization state and a third beam;
a dichroic mirror disposed on a side of the polarized dichroic mirror, and adapted to allow passing of the first beam and the third beam, and reflect the second beam;
a phase retarding component disposed between the polarized dichroic mirror and the dichroic mirror, a polarization state of the second beam being transformed by passing the phase retarding component;
a first light source disposed on the other side of the polarized dichroic mirror, and adapted to output the first beam toward the polarized dichroic mirror;
a second light source disposed on the other side of the polarized dichroic mirror opposite to the dichroic mirror and the phase retarding component, and adapted to output the second beam so that the second beam with the second polarization state arrives the polarized dichroic mirror; and
a third light source, the phase retarding component being disposed between the third light source and the polarized dichroic mirror, the third light source being adapted to output the third beam toward the polarized dichroic mirror by passing through the dichroic mirror and the phase retarding component.

19. The alignment module of claim 18, further comprising:
an optical equalizer disposed on the other side of the polarized dichroic mirror opposite to the first light source, and adapted to receive and equalize the first beam, the second beam and the third beam.

20. The alignment module of claim 18, wherein the phase retarding component is a quarter wave plate.

* * * * *